E. ALSOP.
Grinding Mill.
No. 81.574.
Patented Sept. 1, 1868.
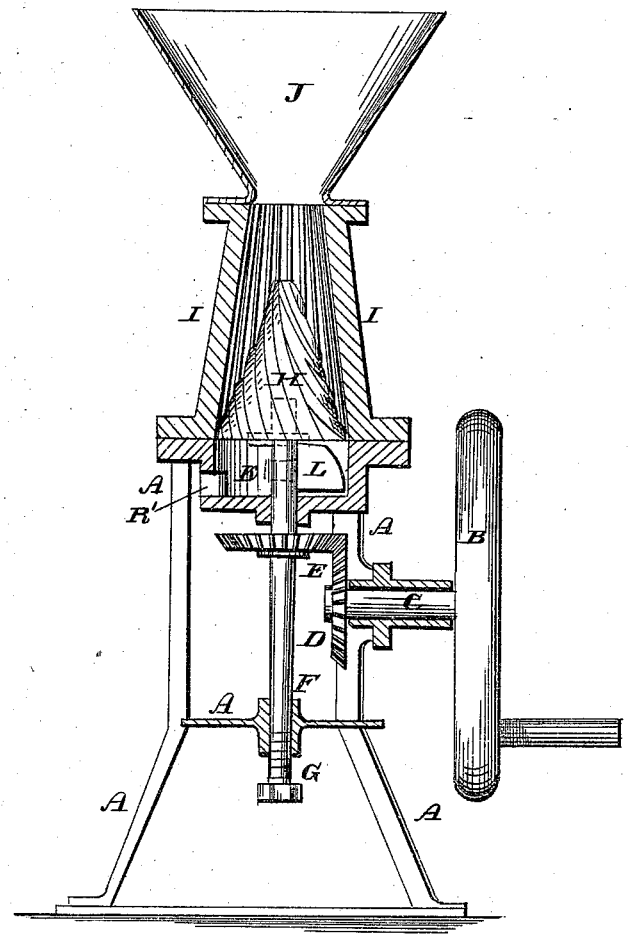
Witnesses:
Wm A. Morgan
G. C. Cotton
Inventor:
E. Alsop
per Munn & Co
Attys

United States Patent Office.

EDWIN ALSOP, OF NEW YORK, N. Y.

Letters Patent No. 81,574, dated September 1, 1868.

IMPROVED HAND-MILL.

The Schedule referred to in these Letters Patent and making part of the same.

TO ALL WHOM IT MAY CONCERN:

Be it known that I, EDWIN ALSOP, of the city, county, and State of New York, have invented a new and improved Hand-Mill; and I do hereby declare that the following is a full, clear, and exact description thereof, which will enable others skilled in the art to make and use the same, reference being had to the accompanying drawing, forming a part of this specification.

The figure is a vertical longitudinal section of my improved mill.

My invention has for its object to furnish a simple, convenient, and effective hand-mill, which shall be so constructed and arranged that it may be used for grinding coffee, spices, grain, seeds, dye-stuffs, oil and water-colors, &c., and which shall not be liable to break or get out of order; and it consists in the construction and combination of the various parts, as hereinafter more fully described.

A is the frame of the mill, which is made of wrought iron, and is, consequently, not liable to break or get out of order. B is the crank-wheel, which is made heavy, so as to act as a fly-wheel. The shaft C, to which the crank-wheel B is attached, revolves in bearings in the frame A, and to its inner end is attached a bevel-gear wheel, D, the teeth of which mesh into the teeth of the bevel-gear wheel E, attached to the vertical shaft F. The vertical shaft revolves in bearings in the centre of the frame A, and its lower end rests and revolves upon the screw-plug G, as shown in the figure. To the upper end of the shaft is removably attached the grinding-cone H, the surface of which is corrugated, and which is hung upon the upper end of the shaft F in a manner similar to that in which the runner of a set of mill-burrs is hung upon the spindle. This enables the cone H to be shifted according to the character of the substance to be ground, or to be conveniently replaced with a new one when worn.

I is the grinding-cylinder, the inner surface of which is corrugated, as shown in the drawing. The cylinder I is formed slightly tapering, and with a flange upon its lower end, by means of which it is bolted to the upper part of the frame A.

J is the hopper, which is made in the shape of an inverted cone, and which is attached to the upper end of the cylinder I.

In the upper part of the frame A, just below the base of the grinding-cone H, is formed a chamber, K, into which the material falls when ground. L is a scraper, attached to the vertical shaft F, and which, as the said shaft revolves, is carried around the chamber K, and scrapes the ground material out through the opening $k'$, formed in one side of the chamber K, whence it falls into a suitable receptacle.

I am aware that the several devices herein described, and mainly, also, their combination, are not new, and I do not, therefore, claim any of said devices separately, nor their combination; but, having thus described my invention,

What I claim as new, and desire to secure by Letters Patent, is—

The arrangement, herein described, of the vertical shaft F, removable grinding-cone H, tapering cylinder I, corrugated vertically on its inside, hopper J, scraper L, chamber K, with discharge-orifice $k'$, wrought-iron frame A, screw-plug G, shaft C, fly-wheel B, and bevel-gearing D E, for the purpose set forth.

The above specification of my invention signed by me, this 14th day of May, 1868.

<div style="text-align:right">EDWIN ALSOP.</div>

Witnesses:
ALEX. F. ROBERTS,
JAMES T. GRAHAM.